United States Patent Office 3,030,395
Patented Apr. 17, 1962

3,030,395
CYCLOPENTADIENYL(HYDROCARBO-THIO)
TITANIUM COMPOUNDS
Sydney A. Giddings, Darien, Conn., assignor to American
Cyanamid Company, New York, N.Y., a corporation
of Maine
No Drawing. Filed Sept. 12, 1961, Ser. No. 137,499
4 Claims. (Cl. 260—429.5)

This invention relates broadly to new and useful titanium compounds. More particularly it is concerned with compounds containing at least one and not more than two cyclopentadienyl radicals attached directly to a titanium atom. Still more particularly the invention is concerned with such compounds represented by the general formula (I)

wherein Cp represents a radical selected from the group consisting of cyclopentadienyl and the lower alkyl-substituted cyclopentadienyl radicals; R represents a monovalent hydrocarbon radical wherein any unsaturation is solely double-bonded; A represents a monovalent substituent selected from the group consisting of (a) radicals represented by —S—R where R has the same meaning as given above and (b) a halogen having an atomic number greater than 9 (i.e., chlorine, bromine or iodine); and B represents a monovalent substituent selected from the group consisting of those defined under (A) and, in addition, a radical represented by Cp and which has the same meaning as given above.

No pertinent prior art is known. The fact that the compounds embraced by Formula I could be prepared was wholly unobvious and unexpected, since it has not been possible to prepare similar compounds wherein the sulfur atom has been replaced by an oxygen atom but which otherwise are the same.

Illustrative examples of lower alkyl-substituted cyclopentadienyl radicals which, in addition to an unsubstituted cyclopentadienyl radical, are represented by Cp in formula I are the monomethyl-, dimethyl-, trimethyl- and tetramethylcyclopentadienyl radicals, and the mono- and poly-(i.e., di-, tri- and tetra-)ethyl, propyl-, isopropyl-, n-butyl-, isobutyl-, sec.-butyl-, n-amyl-, isoamyl-, etc., cyclopentadienyl radicals.

Illustrative examples of monovalent hydrocarbon radically represented by R in the grouping —S—R of Formula I (i.e., monovalent hydrocarbon radicals wherein any unsaturation is solely double-bonded) are alkyl (including cycloalkyl), alkenyl (including cycloalkenyl), aralkyl, aralkenyl, aryl, alkaryl and alkenylaryl. More specific examples of such radicals are methyl, ethyl, propyl, isopropyl, butyl, isobutyl, sec.-butyl, tert.-butyl, amyl to tetracontyl, inclusive (both normal and isomeric forms), cyclopentyl, cyclopentenyl, cyclohexyl, cyclohexenyl, cycloheptyl, etc.; benzyl, phenylethyl, phenylpropyl, phenylisopropyl, phenylallyl, fluorenyl, dinaphthylenemethyl, etc.; phenyl, biphenylyl or xenyl, naphthyl, fenchyl, phenanthyl, benzonaphthyl, anthryl, naphthyl-substituted anthyl, dianthyl and fluorenyl, etc.; tolyl, xylyl, ethylphenyl, propylphenyl, isopropylphenyl, butylphenyl, allylphenyl, etc.; vinyl, allyl, methallyl, propenyl, isopropenyl (beta-allyl), 1-butenyl, 2-butenyl (crotyl), 3-butenyl, pentenyl, hexenyl, butadienyl, pentadienyl, etc.; and, also, radicals represented by Cp and which has the same meaning as given above with reference to Formula I.

The titanium compounds of this invention are useful, for instance, as chemical intermediates in the preparation of organic materials containing titanium and at least one cyclopentadienyl radical and at least one sulfur atom bonded directly to titanium in the molecule; as dyes or dye intermediates; as polymerization or curing catalysts; and as petroleum additives, e.g., as anti-knock agents, ignition promoters, for prevention of preignition, etc. Their extremely high hydrolytic stability and hydrophobic characteristics combined with their ready solubility in aliphatic and aromatic hydrocarbon solvents, as well as others, make them extremely useful and valuable in fields of utility for which the prior-art titanium compounds are entirely unsuited. Such properties, especially hydrolytic and solubility characteristics, were entirely unobvious and unexpected and in no way could have been predicted from the known properties of the prior-art compounds or from compounds which are analogous thereto.

The compounds of the present invention can be prepared, for example, by reacting a compound represented by the general formula (II) 

where Cp has the same meaning as given above with reference to Formula I and X represents a halogen having an atomic number greater than 9 with $x$ moles of a compound represented by the general formula (III) 

where M represents an alkali metal (sodium, potassium, lithium, cesium, rubidium) and R represents a monovalent hydrocarbon radical wherein any unsaturation is solely double-bonded, numerous examples of which radicals have been given hereinbefore. The number of moles ($x$ moles) of the compound of III that are employed depends upon the number of halogens (X's) of the compound of II that it is desired to replace. One mole (as a minimum) of the compound of III is used for each halogen of II to be replaced. If three halogens of II are to be replaced, then it is usually advantageous to use more than three moles of the compound of III, e.g., from about 3.05 to about 4 or more moles of said compound.

The alkali-metal salt of the hydrocarbon mercaptan is prepared in known manner by reacting the corresponding hydrocarbon mercaptan, e.g., phenyl mercaptan, with an alkali metal, e.g., sodium, potassium, etc., in an anhydrous solution of ether or other solvent under an inert atmosphere, e.g., an atmosphere of nitrogen. The reaction is usually carried out under reflux, after which the solvent is evaporated. The residue comprises the desired alkali-metal salt.

The alkali-metal salt of the hydrocarbon mercaptan is then reacted, in molar proportions such as previously have been mentioned, with a compound of the kind represented by Formula II. The reaction is usually carried out in an anhydrous (substantially anhydrous) solvent, e.g., benzene, toluene, xylene, tetrahydrofuran, monoethyl ether of diethyleneglycol, etc., with stirring at temperatures ranging between room temperature (20°–30° C.) and the boiling temperature of the reaction mass. The product is isolated by any suitable means, e.g., by filtration, centrifuging, etc., to separate the by-product salt, followed by crystallization or concentration followed by crystallization of the filtrate. The product is obtained in commercially satisfactory yields.

In order that those skilled in the art may better understand how the present invention can be carried into effect, the following examples are given by way of illustration and not by way of limitation. All parts and percentages are by weight unless otherwise stated.

*Example 1*

This example illustrates the preparation of bis(cyclopentadienyl)bis(phenylthio)titanium, the formula for which is (IV)

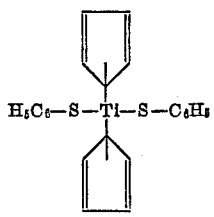

Phenyl mercaptan (also sometimes designated as thiophenol), 33.05 g. (0.3 mole), dissolved in 500 ml. of anhydrous ether (diethyl ether) is treated, that is, contacted, with 6.0 g. (0.26 mole) of metallic sodium under an atmosphere of nitrogen. The resulting reaction mass is heated under reflux at the boiling temperature of the mass, that is, it is refluxed, for 4 hours. Thereafter, it is stirred for 16 hours, after which the ether solvent is removed by evaporation. The residue comprises the sodium salt of phenyl mercaptan.

Anhydrous toluene, 500 ml., and 25 g. (0.1 mole) of bis(cyclopentadienyl) titanium dichloride are added to the aforementioned residue comprising the sodium salt of phenyl mercaptan. The reaction mixture is stirred for 3 hours at room temperature, after which it is heated to reflux and filtered hot. On cooling the resulting deep burgundy solution, crystals separate. These crystals comprising bis(cyclopentadienyl)bis(phenylthio)titanium, M.P. 200°–201° C., yield 14.9 g., are soluble in aliphatic hydrocarbons including hexane, heptane, octane, nonane and higher members of the homologous series; in aromatic hydrocarbons, e.g., benzene, toluene and xylene; in ketones, e.g., acetone, methyl ethyl ketone, etc.; and in other commercially available solvents.

Analysis:

|  | C | H | S |
|---|---|---|---|
| Theoretical, percent | 66.57 | 5.10 | 16.17 |
| Found, percent | 66.52 | 5.25 | 16.26 |

Bis(cyclopentadienyl)bis(vinylphenylthio)titanium is prepared in essentially the same manner as described above with the exception that an equivalent molar amount of vinylphenyl mercaptan is employed instead of phenyl mercaptan.

Example 2

The compound, bis(methylcyclopentadienyl)bis(p-tolylthio)titanium, the formula for which is (V)

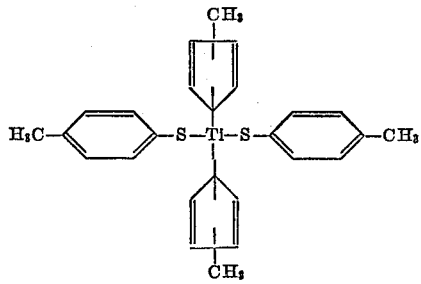

is prepared in essentially the same manner as described under Example 1 with reference to the production of bis(cyclopentadienyl)bis(phenylthio)titanium with the exception that instead of 33.05 g. (0.3 mole) of phenyl mercaptan there is used an equivalent molar amount of p-tolyl mercaptan; and, instead of bis(cyclopentadienyl)titanium dichloride, there is employed an equivalent molar amount of bis(methylcyclopentadienyl)titanium dichloride. The product is identified by analysis and infrared spectra as bis(methylcyclopentadienyl)bis(p-tolylthio)titanium.

The corresponding bis(o-tolylthio) and bis(m-tolylthio) titanium derivatives are produced in exactly the same way as described above, using an equivalent amount of o-tolyl mercaptan or m-tolyl mercaptan in place of p-tolyl mercaptan in making the corresponding sodium salt which is then reacted with bis(methylcyclopentadienyl)titanium dichloride.

The corresponding bis(butadienylthio)titanium derivative is prepared in a similar manner but substituting an equivalent molar amount of butadienyl mercaptan for o-, m- or p-tolyl mercaptan.

Example 3

The compound bis(cyclopentadienyl)bis(benzylthio)titanium is prepared in essentially the same manner described under Example 1 with the exception that instead of phenyl mercaptan there is used an equivalent molar amount of benzyl mercaptan; instead of metallic sodium there is used an equivalent molar amount of metallic potassium; and in place of bis(cyclopentadienyl)titanium dichloride there is employed an equivalent molar amount of bis(cyclopentadienyl)titanium dibromide. The product is identified by analysis and infrared spectra as bis(cyclopentadienyl)bis(benzylthio)titanium.

The corresponding bis(phenylallylthio)titanium derivative is prepared in a similar manner but substituting an equivalent molar amount of phenylallyl mercaptan for benzyl mercaptan.

Example 4

The compound cyclopentadienyl methylcyclopentadienyl bis(cyclopentyl)titanium is prepared in essentially the same manner described under Example 1 with the exception that instead of phenyl mercaptan there is employed an equivalent molar amount of cyclopentyl mercaptan; and in place of bis(cyclopentadienyl)titanium dichloride there is used an equivalent molar amount of cyclopentadienyl methylcyclopentadienyl titanium dichloride. The product is identified by analysis and infrared spectra as cyclopentadienyl methylcyclopentadienyl bis(cyclopentyl)titanium.

Example 5

The compound bis(cyclopentadienyl) allylthio phenylthio titanium, the formula for which is (VI)

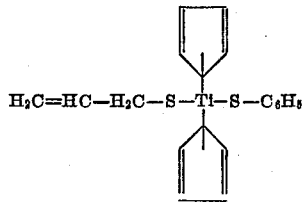

is prepared in essentially the same manner described under Example 1 with the exception that instead of phenyl mercaptan alone there is used an equivalent molar amount each of allyl mercaptan and phenyl mercaptan; and in place of bis(cyclopentadienyl)titanium dichloride there is employed an equivalent molar amount of bis(cyclopentadienyl)titanium diiodide. The product is identified by analysis and infrared spectra as bis(cyclopentadienyl) allylthio phenylthio titanium.

Example 6

The compound bis(cyclopentadienyl)bis(cyclopentadienylthio) titanium is prepared in essentially the same manner described under Example 1 with the exception that instead of phenyl mercaptan there is employed an equivalent molar amount of cyclopentadienyl mercaptan. The product is identified by analysis and infrared spectra as bis(cyclopentadienyl)bis(cyclopentadienylthio)titanium.

Example 7

This example illustrates the preparation of bis(cyclopentadienyl)bis(methylthio)titanium.

Metallic sodium (3.0 g.; 0.13 mole), cut into thin strips, is dispersed into 500 ml. of anhydrous diethyl ether under an atmosphere of nitrogen. Fifty (50) ml. of methyl mercaptan (0.9 mole) is added and the resulting mixture is stirred. A Dry-Ice condenser and a potassium hydroxide trap are used to condense the low-boiling mercaptan and to remove noxious vapors. Stirring is continued for 4 days, after which 500 ml. of anhydrous toluene is added, followed by 12.5 g. (0.05 mole) of bis(cyclopentadienyl)-titanium dichloride. Stirring of the resulting reaction mass is continued for 3 hours. Thereafter it is heated to reflux and filtered while still hot. Upon cooling crystals, M.P. 194°–197° C., similar in color to those of the product of Example 1, are obtained. The yield of the product comprising bis(cyclopentadienyl)bis(methylthio)titanium amounts to 8.2 g. It is soluble in aliphatic and aromatic hydrocarbon solvents, including pentane, hexane, heptane, octane, nonane, decane, benzene, toluene, xylene, etc.

Analysis:

|  | C | H | S |
|---|---|---|---|
| Theoretical, percent | 52.76 | 5.91 | 23.55 |
| Found, percent | 53.43 | 5.54 | 23.20 |

*Example 8*

This example illustrates the preparation of cyclopentadienyl bis(methylthio) chloro titanium, the formula for which is (VII)
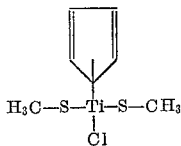

The procedure is essentially the same as that described under Example 7 with the exception that two moles of CH$_3$—S—Na (produced from methyl mercaptan as described in Example 7) is reacted in anhydrous toluene with one mole of cyclopentadienyl titanium trichloride. The product is identified by analysis and infrared spectra as cyclopentadienyl bis(methylthio) chloro titanium.

In a similar manner cyclopentadienyl tris(methylthio)-titanium is prepared by reacting at least 3 moles, preferably from 3.05 to 4.0 moles, of CH$_3$—S—Na with 1 mole of cyclopentadienyl titanium trichloride.

*Example 9*

This example illustrates the preparation of bis(cyclopentadienyl)bis(dodecylthio)titanium.

The procedure is exactly the same as in Example 1 with the exception that the following quantities of reactants are used instead of those specified in that example: 30.3 g. (0.15 mole) dodecyl mercaptan, 3.0 g. (0.13 mole) metallic sodium, and 12.5 g. (0.05 mole)bis(cyclopentadienyl)titanium dichloride. The product comprising bis-(cyclopentadienyl)bis(dodecylthio)titanium is too soluble in hexane to recrystallize from this solvent. Its infrared spectra and color are consistent with that of the expected compound.

*Example 10*

This example illustrates the preparation of cyclopentadienyl naphthylthio dichloro titanium, the formula for which is (VIII)
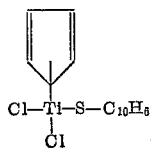

Essentially the same procedure is followed as described under Example 1 with the exception that, instead of the sodium salt of thiophenol, there is produced the sodium salt of thionaphthol from thionaphthol. One mole of the sodium salt of thionaphthol is reacted in anhydrous toluene with one mole of cyclopentadienyl titanium trichloride. The product is identified by analysis and infrared spectra as cyclopentadienyl naphthylthio dichloro titanium.

*Example 11*

This example illustrates one of the many fields of utility of the compounds of the present invention, specifically bis(cyclopentadienyl)bis(phenylthio)titanium, as a catalyst ingredient in a low-bake furniture finish.

|  | Parts |
|---|---|
| Solution of butylated urea-formaldehyde resin (55% resin solids, 45% of a 50–50 solvent mixture of butanol and xylene) | 100.0 |
| Solution of a glyceryl phthalate resin modified with rosin and linseed oil acids (50% resin solids, 50% xylene) | 100.0 |
| Catalyst (solution of 40% methyl acid pyrophosphate dissolved in a solvent comprising mainly butanol) | 5.0 |
| Catalyst [solution of 20% of bis(cyclopentadienyl)bis(phenylthio)titanium dissolved in xylene] | 10.0 |
| Xylene | 12.0 |
| Butanol | 20.0 |
| Flatting agent, specifically silica gel | 7.5 |

The silica gel is ground into the other components of the above-described composition, which is a low-bake furniture finish using regular pebble-mill technique. After grinding for 24 hours, the amount of flattening agent is adjusted to give a gloss rating of 80 on the 60° Gardner glossometer. The 10 parts of the solution of 20% of bis(cyclopentadienyl)bis(phenylthio)titanium dissolved in xylene materially accelerates the curing of the applied finish on furniture as compared with the same composition when applied on furniture and tested in the same manner.

I claim:

1. A compound of the class represented by the general formula

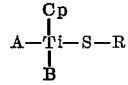

wherein Cp represents a radical selected from the group consisting of cyclopentadienyl and the lower alkyl-substituted cyclopentadienyl radicals; R represents a monovalent hydrocarbon radical wherein and unsaturation is solely double-bonded; A represents a monovalen substituent selected from the group consisting of (*a*) radicals represented by —S—R where R has the same meaning as given above and (*b*) a halogen having an atomic number greater than 9; and B represents a monovalent substituent selected from the group consisting of those defined under (A) and, in addition, a radical represented by Cp and which has the same meaning as given above.

2. Bis(cyclopentadienyl)bis(methylthio)titanium.
3. Bis(cyclopentadienyl)bis(dodecylthio)titanium.
4. Bis(cyclopentadienyl)bis(phenylthio)titanium.

No references cited.

UNITED STATES PATENT OFFICE
CERTIFICATE OF CORRECTION

Patent No. 3,030,395

April 17, 1962

Sydney A. Giddings

It is hereby certified that error appears in the above numbered patent requiring correction and that the said Letters Patent should read as corrected below.

Column 1, line 45, for "ethyl" read -- ethyl- --; line 46, for "isobutyl" read -- isobutyl- --; lines 60 and 61, for "phenanthyl" read -- phenanthryl --; lines 61 and 62, for "anthyl" read -- anthryl --; same column 1, line 62, for "dianthyl" read -- dianthryl --; column 2, line 8, for "fiields" read -- fields --; line 12, for "predicited" read -- predicted --; column 5, lines 67 to 72, right-hand portion of formula (VIII), for "-$C_{10}H_6$" read -- -$C_{10}H_7$ --; column 6, line 36, for "flattening" read -- flatting --; line 55, for "and" read -- any --; line 56, for "monovalen" read -- monovalent --.

Signed and sealed this 7th day of August 1962.

(SEAL)
Attest:

ERNEST W. SWIDER

Attesting Officer

DAVID L. LADD

Commissioner of Patents